United States Patent [19]
Backlund

[11] 4,060,017
[45] Nov. 29, 1977

[54] METHOD OF CUTTING LITHIUM

[75] Inventor: John R. Backlund, Chalfont, Pa.

[73] Assignee: Honeywell Inc., Minneapolis, Minn.

[21] Appl. No.: 770,180

[22] Filed: Feb. 18, 1977

[51] Int. Cl.$^2$ .................. B26D 7/06; B26D 5/08
[52] U.S. Cl. .................................. 83/23; 83/31; 83/167; 83/542; 83/547
[58] Field of Search ............ 83/31, 547, 542, 925 R, 83/23, 28, 167

[56] References Cited
U.S. PATENT DOCUMENTS 2,127,960   8/1938   Piazze ........................... 83/31 X Primary Examiner—J. M. Meister
Attorney, Agent, or Firm—John S. Munday

[57] ABSTRACT

A method for cutting lithium metal into a plurality of pieces, and a device for accomplishing the method, are disclosed, comprising the steps of positioning a quantity of lithium metal at a predetermined position between an anvil means and a cutting means which are positioned in operating relationship with each other. A thin flexible film, preferably a plastic, is interposed between the blade and the lithium such that when the blade is forced against the anvil with sufficient force to cut the lithium, the film prevents contact of the blade with the lithium. Indexing of the lithium and the film after each cut permits repetitive cutting to provide a plurality of pieces from the lithium metal stock.

11 Claims, 2 Drawing Figures

METHOD OF CUTTING LITHIUM

BACKGROUND OF THE INVENTION

While lithium metal has a wide variety of uses in present-day industry, one use which is substantially increasing at the present time is the use of lithium as an anode in non-aqueous batteries. These "lithium" batteries have extremely long life and high energy, and are therefore valuable additions to the battery art. Lithium batteries are, however, substantially more expensive than conventional dry cells and, for that reason, every effort is being made to reduce the cost of manufacturing batteries containing lithium anodes.

Lithium itself is a very light weight soft metal and is, for a metal, highly reactive. For example, lithium in contact with water will react to form lithium oxide and hydrogen gas, presenting a potential fire hazard. Conventional methods for cutting lithium involve the use of knives or dies. Due to cold welding of lithium on the blade at the cutting edge, a clean dry blade develops a build-up of lithium which needs to be removed after only a few cutting operations. It has further been proposed to use lubricants on the blade to prevent contamination by the lithium on the blade. It has further been proposed to use lubricants on the blade to prevent contamination by the lithium on the blade. This, however, results in contamination of the lithium with the lubricant. Lithium which is to be used in a battery must be cleaned, necessitating an additional step in the manufacturing process.

Accordingly, it is an object of this invention to provide a method for cutting lithium which permits repetitive cutting in the simplest possible manner.

Another object of this invention is to provide a device suitable for cutting lithium metal into a plurality of pieces wherein neither the lithium nor the knife blade are contaminated by contacting each other.

Other objects will appear herein.

BRIEF DESCRIPTION OF THE INVENTION

Accordingly, it has now been discovered that the above and other objects of the present invention may be accomplished in the following manner. Specifically, it has been discovered that lithium may be cut into a plurality of pieces according to the present invention. A quantity of lithium metal is positioned at a predetermined position between an anvil means and a cutting blade means. A thin flexible film, such as a polyethylene film, is interposed between the blade and the lithium to prevent contact of the blade with the lithium. The blade is then forced against the anvil to cut the lithium. This operation can be repeated to provide a plurality of pieces of lithium from the base lithium stock. After each cut, the lithium and the film are indexed to reposition the lithium stock and to provide a new cushion of the thin flexible film interposed between the blade and the lithium.

DETAILED DESCRIPTION OF THE INVENTION AND DRAWINGS

Figure 1:
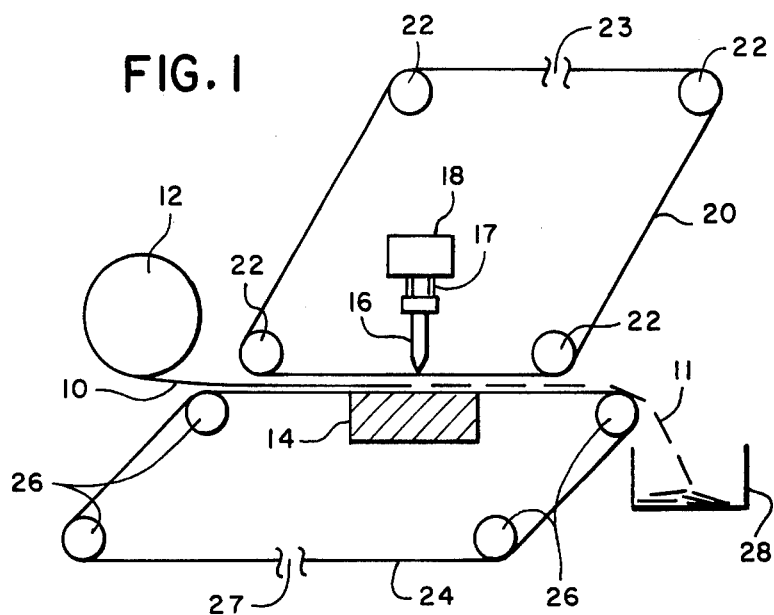
Figure 2:
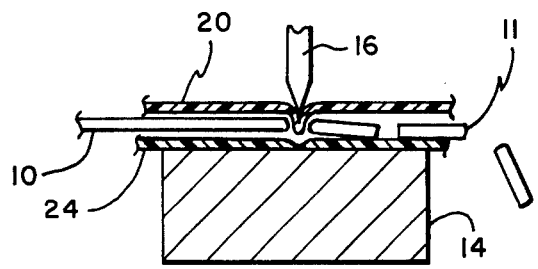

For a more complete understanding of the invention, reference is hereby made to the drawings, in which:

FIG. 1 represents a schematic view of one embodiment of the present invention; and FIG. 2 is a detailed schematic view of the cutting sequence of the embodiment shown in FIG. 1.

As shown in FIG. 1, a quantity of lithium metal is being cut into a plurality of pieces of the lithium metal. The stock of lithium ribbon is stored on a driven spool 12 by a motor not shown so as to position the lithium between the anvil means 14 and the cutting blade means 16 in a predetermined position for cutting. Interposed between the lithium 10 and the cutting blade 16 is a thin flexible film 20. This film may be made from any material which is inert to lithium and which is flexible enough to permit the knife blade to cut the lithium metal without itself being cut. Examples of suitable materials are the various plastics such as polyethylene, polyproplyene, polyamides, polytetrafluroethylenes, and the like. Typical thicknesses of the film range from at least 0.0001 inches to 0.010 inches, with a preferred thickness being approximately 0.001 inches. All that is necessary is that the film be sufficiently flexible to tolerate some deformation during the cutting step.

The film 20 is driven past the knife blade 16 by motors, not shown, around rollers 22 which permit the presentation of a fresh area of film for each cut to be made. The film may be recycled for continuous operation or may be discarded after one use, depending upon the amount of deformation caused by each cutting step. Break 23 is shown to permit either option.

A second film 24 is positioned between the anvil 14 and the lithium metal 10 as a preferred embodiment of the present invention. This second film 24 serves to protect the anvil 14 from being contaminated by the lithium metal 10, thereby preventing buildup of lithium at the cutting junction. The second film 24 serves a further purpose in that it is rotated after each cut about rollers 26, it carries the cut pieces 11 of the lithium metal 10 to collecting means 28. Again, break 27 is provided to indicate that the film 24 may be continuously recircled or may be discarded upon a single use.

In the embodiment shown in FIG. 1, the knife 16 is urged against the anvil 14 by pistons 17 and motor 18. After each cut is made, the lithium metal 10 is indexed by driving roller 12. Simultaneously, the films 20 and 24 are indexed a suitable amount around rollers 22 and 26, respectively.

As the blade 16 is urged towards the anvil 14, as more clearly shown in FIG. 2, the upper film 20 which is interposed between the lithium 10 and the blade 16 is substantially deformed. Similarly, the lower film 24 is deformed as the blade 16 forces itself towards the anvil 14, cutting the lithium into pieces 11.

It should be noted that, for the purposes of example, a single knife blade has been shown. Equally suitable for use in the present invention are cutting tools which might be of differing shapes such as circular, rectangular and the like. Similarly, the anvil 14 has been shown to be a flat surface but other surface shapes may be employed, depending upon the ultimate shape of the pieces to be produced.

A pilot assembly machine was constructed according to the principles of the present invention to demonstrate its efficiency. After construction, and using a polyethylene film having a thickness of approximately 0.001 inches, a pilot product run was accomplished in which lithium metal was cut into a large number of small pieces. Specifically, several thousand cuts were made with the same blade, without any maintenance being required. In prior art methods, a clean blade directly contacting the lithium metal would require cleaning after only about six or seven cuts.

Having thus described the invention, what is claimed is:

1. A method of cutting lithium metal into a plurality of pieces, comprising the steps of:
    positioning a quantity of lithium metal at a predetermined position between an anvil means and a cutting blade means;
    interposing a thin flexible film between said blade means and said lithium, said film being inert to said lithium;
    repetitively forcing said blade means toward said anvil means with sufficient force to cut said lithium, and retracting said blades; and indexing said lithium and said film after each cut.

2. The method of claim 1 wherein said film prevents contact of said blade with said lithium.

3. The method of claim 2 wherein said film is a plastic film having a thickness ranging from 0.0001 to 0.01 inches.

4. The method of claim 1 wherein said plastic film is approximately 0.001 inches thick.

5. The method of claim 2 which further includes the step of positioning a second thin flexible film between said anvil means and said lithium, and indexing said second film after each cut.

6. The method of claim 5, which further includes the step of carrying cut pieces of lithium on one of said films to a collecting means.

7. A device suitable for cutting lithium metal into a plurality of pieces, comprising:
    cutting means;
    anvil means positioned in operating relationship with said cutting means;
    means for positioning a quantity of lithium metal between said blade means and said anvil means;
    a thin flexible film interposed between said cutting means and said lithium, said film being inert to said lithium;
    actuating means for repetitively forcing said cutting means toward said anvil means with sufficient force to cut said lithium and retracting said cutting means;
    said actuating means being adapted to force said cutting means against said anvil means with sufficient force to cut said lithium but not sufficient force to cut said film; and
    indexing means for indexing said film and said lithium after each cut.

8. The device of claim 7 wherein said film is a plastic film having a thickness ranging from 0.0001 to 0.01 inches.

9. The device of claim 8 wherein said film is a plastic film having a thickness of approximately 0.001 inches.

10. The device of claim 7 which further includes a second thin flexible film interposed between said anvil means and said lithium, and said indexing means further includes means for indexing said second film after each cut.

11. The device of claim 10, which further includes collecting means for receiving cut pieces of lithium carried by one of said film.

* * * * *